US011862874B2

(12) United States Patent
Huang

(10) Patent No.: US 11,862,874 B2
(45) Date of Patent: Jan. 2, 2024

(54) ANTENNA STRUCTURE AND ANTENNA-IN-PACKAGE

(71) Applicant: AchernarTek Inc., San Diego, CA (US)

(72) Inventor: Wei Huang, San Diego, CA (US)

(73) Assignee: ACHERNARTEK INC., San Diego, CA (US)

( * ) Notice: Subject to any disclaimer, the term of this patent is extended or adjusted under 35 U.S.C. 154(b) by 53 days.

(21) Appl. No.: 17/717,201

(22) Filed: Apr. 11, 2022

(65) Prior Publication Data

US 2023/0038429 A1 Feb. 9, 2023

Related U.S. Application Data

(60) Provisional application No. 63/228,615, filed on Aug. 3, 2021.

(51) Int. Cl.

| | |
|---|---|
| ***H01Q 9/04*** | (2006.01) |
| ***H01Q 1/02*** | (2006.01) |
| ***H01Q 5/378*** | (2015.01) |

(52) U.S. Cl.

CPC ............. *H01Q 9/0414* (2013.01); *H01Q 1/02* (2013.01); *H01Q 5/378* (2015.01)

(58) Field of Classification Search

CPC ......... H01Q 9/0414; H01Q 1/02; H01Q 5/378

See application file for complete search history.

(56) References Cited

U.S. PATENT DOCUMENTS

| | | | | |
|---|---|---|---|---|
| 10,804,227 B2 | 10/2020 | Kamgaing et al. | | |
| 11,050,138 B2 | 6/2021 | Huang et al. | | |
| 11,081,807 B2 | 8/2021 | Jong et al. | | |
| 11,355,838 B2 | 6/2022 | Baheti et al. | | |
| 2007/0229357 A1* | 10/2007 | Zhang | H01Q 9/0407 | 343/770 |
| 2010/0073238 A1* | 3/2010 | Jun | H01Q 9/0457 | 343/700 MS |

FOREIGN PATENT DOCUMENTS

| | | |
|---|---|---|
| CN | 109256612 A | 1/2019 |
| CN | 111710956 A | 9/2020 |
| CN | 112385081 A | 2/2021 |
| TW | 201803043 A | 1/2018 |

* cited by examiner

*Primary Examiner* — Dieu Hien T Duong

(74) *Attorney, Agent, or Firm* — McClure, Qualey & Rodack, LLP

(57) ABSTRACT

An antenna structure includes a main radiator element, a parasitic radiator element, a feeder and at least one first high-impedance member. The parasitic radiator element is disposed in parallel with the main radiator element. The feeder is configured to electrically or electromagnetically couple the main radiator element. The at least one first high-impedance member directly contacts the parasitic radiator element and is configured to be electrically grounded.

19 Claims, 7 Drawing Sheets

ANTENNA STRUCTURE AND ANTENNA-IN-PACKAGE

RELATED APPLICATIONS

This application claims priority to U.S. Provisional Application Ser. No. 63/228,615, filed Aug. 3, 2021, which is herein incorporated by reference.

BACKGROUND

Field of the Invention

The disclosure relates to an antenna field, and more particularly to an antenna structure and an antenna-in-package.

Description of Related Art

5G New Radio (NR) is a recently developed radio access technology that supports high throughput, low latency and large capacity communications. In comparison with previous 4G radio communication systems, a 5G NR device uses a millimeter wave (mmWave) carrier signal to up-convert baseband data into a radio frequency (RF) signal for radio transmissions. On the other hand, in response to market orientation, most communication products, such as smartphones, 5G femtocells, etc., have recently moved toward compact and low cost specifications. Antennas for 5G mmWave applications make use of a number of radiating elements with smaller sizes to form an array for beamforming operations at high frequencies (e.g. from 24.25 GHz to 52.6 GHz). In a case of state-of-the-art power amplifiers for mmWave applications, the power added efficiency is typically below 20%, which means that the majority of DC power will be converted into convection heat. This especially becomes significant for a large-scale phased antenna array containing tens or even hundreds of radiator elements. The entire system would suffer from degradation in performance due to high operating temperature as well as malfunctions and mechanical damage such as warpage or delamination within the antenna structure thereof. Therefore, thermal management is essential for mmWave devices to assure electrical and mechanical reliability.

SUMMARY

One aspect of the disclosure directs to an antenna structure which includes a main radiator element, a parasitic radiator element, a feeder and at least one first high-impedance member. The parasitic radiator element is disposed in parallel with the main radiator element. The feeder is configured to electrically or electromagnetically couple the main radiator element. The at least one first high-impedance member directly contacts the parasitic radiator element and is configured to be electrically grounded.

In accordance with one or more implementations of the disclosure, the at least one first high-impedance member and the parasitic radiator element are coplanar and in the same metal layer.

In accordance with one or more implementations of the disclosure, the antenna structure further includes a dielectric layer that is interposed between the main radiator element and the parasitic radiator element.

In accordance with one or more implementations of the disclosure, the parasitic radiator element is a rectangular patch radiator, and the at least one first high-impedance member are four high-impedance traces respectively contacting four edges of the parasitic radiator element.

In accordance with one or more implementations of the disclosure, the antenna structure further includes at least one second high-impedance member that directly contacts the main radiator element and is configured to be electrically grounded.

In accordance with one or more implementations of the disclosure, the at least one second high-impedance member and the main radiator element are coplanar and in the same metal layer.

In accordance with one or more implementations of the disclosure, the main radiator element is a rectangular patch radiator, and the at least one second high-impedance member are four high-impedance traces respectively contacting four edges of the main radiator element.

In accordance with one or more implementations of the disclosure, the antenna structure further includes a grounding structure that directly contacts the at least one high-impedance member and laterally surrounds the main radiator element and the parasitic radiator element.

In accordance with one or more implementations of the disclosure, the grounding structure includes grounding vias each extending from a vertical level of the main radiator element to a vertical level of the parasitic radiator element.

Another aspect of the disclosure directs to an antenna structure which includes a main radiator element, a parasitic radiator element, a feeder and at least one high-impedance member. The parasitic radiator element is disposed in parallel with the main radiator element. The feeder is configured to electrically or electromagnetically couple the main radiator element. The at least one first high-impedance member directly contacts the main radiator element and is configured to be electrically grounded.

In accordance with one or more implementations of the disclosure, the at least one high-impedance member and the main radiator element are coplanar and in the same metal layer.

In accordance with one or more implementations of the disclosure, the antenna structure further includes a dielectric layer that is interposed between the main radiator element and the parasitic radiator element.

In accordance with one or more implementations of the disclosure, the main radiator element is a rectangular patch radiator, and the at least one high-impedance member are four high-impedance traces respectively contacting four edges of the main radiator element.

Yet another aspect of the disclosure directs to an antenna-in-package which includes a multilayer substrate and a chip. The multilayer substrate has a stack of dielectric layers and metal layers, and includes a main radiator element, a parasitic radiator element, a first feeder, at least one high-impedance member and a grounding structure. The parasitic radiator element is disposed in parallel with the main radiator element. The first feeder is configured to electrically or electromagnetically couple the main radiator element. The at least one high-impedance member directly contacts the parasitic radiator element and is configured to be electrically grounded. The grounding structure directly contacts the at least one high-impedance member and laterally surrounds the main radiator element and the parasitic radiator element. The chip is bonded to the multilayer substrate and electrically coupled to the main radiator element and the grounding structure.

In accordance with one or more implementations of the disclosure, the at least one high-impedance member and the parasitic radiator element are coplanar and in the same one of the metal layers.

In accordance with one or more implementations of the disclosure, the grounding structure includes grounding vias each vertically extending from a uppermost metal layer of the metal layers to a lowermost metal layer of the metal layers.

In accordance with one or more implementations of the disclosure, the parasitic radiator element is a rectangular patch radiator, and the at least one high-impedance member are four high-impedance traces respectively contacting four edges of the parasitic radiator element.

In accordance with one or more implementations of the disclosure, the antenna-in-package further includes a second feeder that electrically or electromagnetically couples the main radiator element. The first feeder and the second feeder are configured to generate a dual-polarized radiation pattern on the multilayer substrate.

In accordance with one or more implementations of the disclosure, the main radiator element is vertically between the parasitic radiator element and the chip.

In accordance with one or more implementations of the disclosure, the chip is a radio-frequency integrated chip (RFIC).

BRIEF DESCRIPTION OF THE DRAWINGS

The foregoing aspects and many of the accompanying advantages of this disclosure will become more readily appreciated as the same becomes better understood by reference to the following detailed description, when taken in conjunction with the accompanying drawings.

DETAILED DESCRIPTION

Figure 1A:
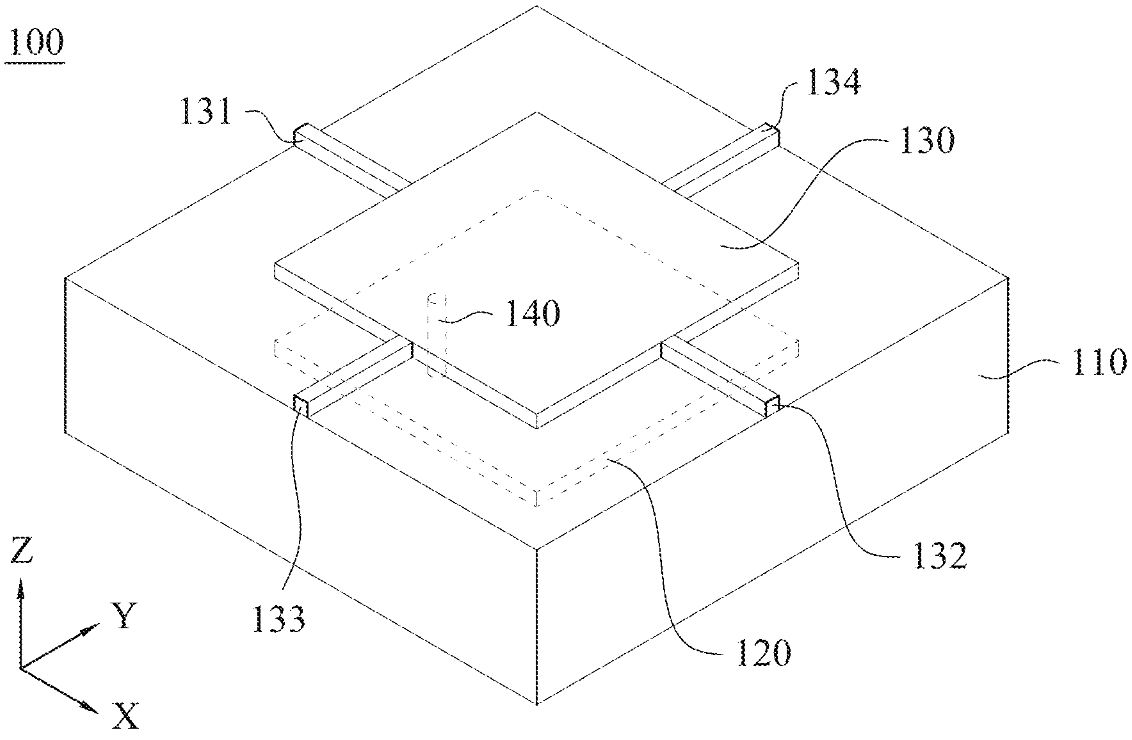
FIG. 1A is a top view of an antenna structure in accordance with some implementations of the disclosure.

The detailed explanation of the disclosure is described as following. The described preferred embodiments are presented for purposes of illustrations and description, and they are not intended to limit the scope of the disclosure.

Terms used herein are only used to describe the specific embodiments, which are not used to limit the claims appended herewith. Unless limited otherwise, the term "a," "an," "one" or "the" of the single form may also represent the plural form.

The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

In the following description and claims, the term "couple" along with their derivatives, may be used. In particular embodiments, "couple" may be used to indicate that two or more elements are in direct physical or electrical contact with each other, or may also mean that two or more elements may not be in direct contact with each other. "Couple" may still be used to indicate that two or more elements cooperate or interact with each other.

It will be understood that, although the terms "first," "second," "third" . . . etc., may be used herein to describe various elements and/or components, these elements and/or components, should not be limited by these terms. These terms are only used to distinguish elements and/or components.

The document may repeat reference numerals and/or letters in the various examples. This repetition is for the purpose of simplicity and clarity and does not in itself dictate a relationship between the various embodiments and/or configurations discussed. In addition, within the descriptions of the figures, similar elements are provided similar names and reference numerals as those of the previous figure(s). Where a later figure utilizes the element in a different context or with different functionality, the element is provided with a different leading numeral representative of the figure number (e.g. 1xx for FIG. 1A and 3xx for FIG. 3). The specific numerals assigned to the elements are provided solely to aid in the description and not meant to imply any structural or functional limitations.

FIG. 1A is a schematic view of an antenna structure 100 in accordance with some implementations of the disclosure. The antenna structure 100 includes a substrate 110, a main radiator element 120, a parasitic radiator element 130, high-impedance members 131-134 and a feeder 140. The substrate 110 may be formed of one of more dielectric layers, and one of the dielectric layers may be interposed between the main radiator element 120 and the parasitic radiator element 130, such that the main radiator element 120 and the parasitic radiator element 130 are physically spaced. The substrate 110 may be a multi-layered board structure formed of alternately stacked dielectric layers and metal layers for some implementations, in which the main radiator element 120 and the parasitic radiator element 130 may be in two of the metal layers, respectively. The dielectric layer(s) of the substrate 110 may be formed from FR4 material, glass, ceramic, epoxy resin or silicon. The main radiator element 120 and the parasitic radiator element 130 may be disposed in/on the substrate 110, and/or may be in parallel and overlapped with each other in a normal direction of the substrate 110 (e.g. the z-axis direction shown in FIGS. 1A and 1B) for eliminating surface waves in the antenna structure 100. In some implementations, as shown in FIG. 1A, the main radiator element 120 and the parasitic radiator element 130 are rectangular patch radiators. Other shapes and/or types of the main radiator element 120 and the parasitic radiator element 130 may be adopted in other implementations. The main radiator element 120 and the parasitic radiator element 130 may be physically spaced by one or more of the dielectric layers in the substrate 110.

The high-impedance members 131-134 directly contact the parasitic radiator element 130, and are configured to be electrically grounded. As shown in FIG. 1A, the high-impedance members 131-134 respectively contact four edges of the parasitic radiator element 130. The high-impedance members 131-134 may be coplanar with the parasitic radiator element 130 and in the same metal layer. Also, the parasitic radiator element 130 and the high-impedance members 131-134 may be formed from the same material and by the same process. The high-impedance members 131-134 may be high-impedance traces (e.g. straight high-impedance traces) each with an impedance value higher than that of the parasitic radiator element 130; the longitudinal direction of the high-impedance members 131-132 may be parallel to the x-axis direction, and the longitudinal direction of the high-impedance members 133-134 may be parallel to the y-axis direction. Other shapes (e.g. meandered shapes or tapered shapes), patterns and/or locations of the high-impedance members 131-134 may be adopted in other implementations. For example, the high-impedance members 131-134 may extend respectively from four corners of the parasitic radiator element 130 in some other implementations.

Figure 1B:
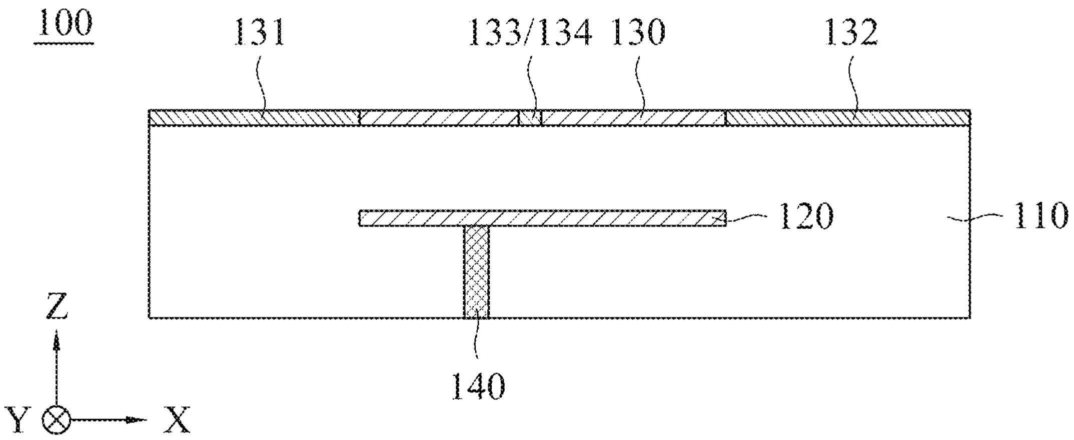
FIG. 1B is a partial schematic cross-sectional view of the antenna structure shown in FIG. 1A.

The feeder 140 is disposed in the substrate 110 for electrically or electromagnetically couple energy to the main radiator element 120. The feeder 140 may be a via structure coupled to the main radiator element 120 and a feeding source. In addition, the feeder 140 may electrically couple to other electrical components in the same antenna structure 100, such as an active electrical component (e.g. a switch), a passive electrical component (e.g. an inductor), and/or the like, or an electrical device external to the antenna structure 100. In some implementations, as shown in FIG. 1B, the feeder 140 directly contacts the main radiator element 120 for directly coupling energy to the main radiator element 120. The feeder 140 may be changed to be a feeding probe for electromagnetically coupling energy to the main radiator element 120. In some implementations, a metal plate with a slot may be interposed between the main radiator element 120 and the feeder 140 to form a slot antenna.

Figure 2A:
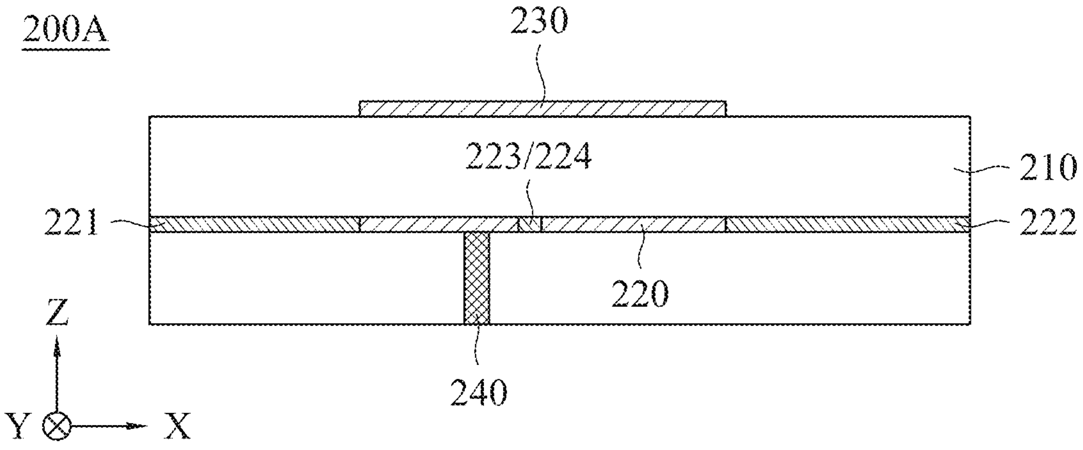
FIGS. 2A-2D are respective schematic side views of antenna structures in accordance with some implementations of the disclosure.

In addition, various arrangements of high-impedance members for thermal dissipation may be made by referring to the above descriptions related to the antenna structure 100 as well as FIGS. 1A-1B. For example, FIGS. 2A-2D are respective schematic side views of antenna structures 200A-200D in accordance with some implementations of the disclosure. In FIG. 2A, the antenna structure 200A includes a substrate 210, a main radiator element 220, high-impedance members 221-224, a parasitic radiator element 230 and a feeder 240. In the antenna structure 200A, the high-impedance members 221-224 are coplanar with and directly contact the main radiator element 220 instead of the parasitic radiator element 230. The high-impedance members 221-224 are all grounded, and each of the high-impedance members 221-224 has an impedance value higher than that of the main radiator element 220. The main radiator element 220 and the high-impedance members 221-224 may be formed from the same material and by the same process.

Figure 2B:
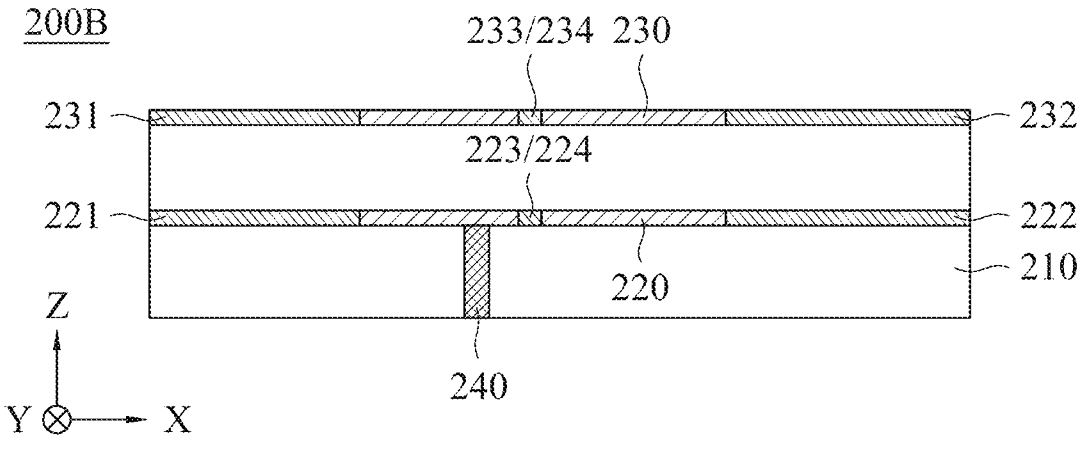

In FIG. 2B, the antenna structure 200B includes a substrate 210, a main radiator element 220, high-impedance members 221-224, a parasitic radiator element 230, high-impedance members 231-234 and a feeder 240. The high-impedance members 221-224 and 231-234 are all grounded. The high-impedance members 221-224 are coplanar with and directly contact the main radiator element 220, and each of the high-impedance members 221-224 has an impedance value higher than that of the main radiator element 220. Similarly, the high-impedance members 231-234 are coplanar with and directly contact the parasitic radiator element 230, and each of the high-impedance members 231-234 has an impedance value higher than that of the parasitic radiator element 230. The main radiator element 220 and the high-impedance members 221-224 may be formed from the same material and by the same process, and/or the parasitic radiator element 230 and the high-impedance members 231-234 may be formed from the same material and by the same process.

Figure 2C:
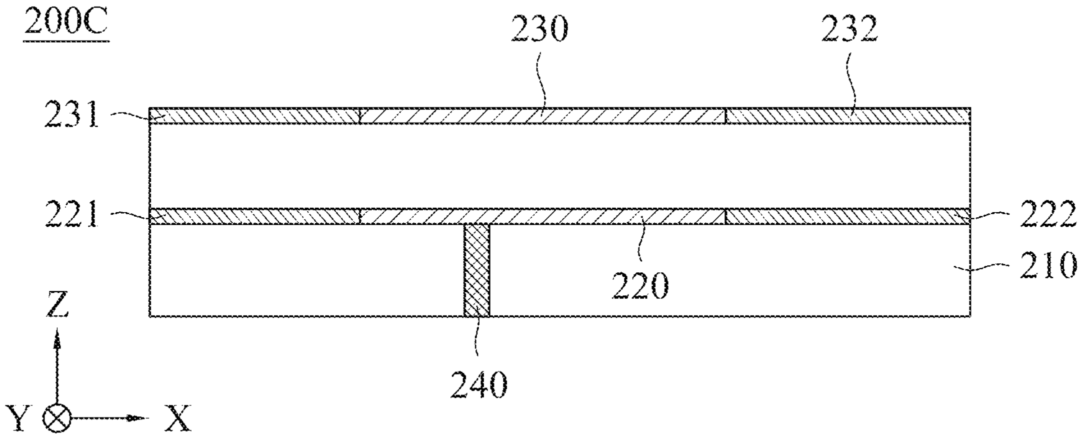

In FIG. 2C, the antenna structure 200C includes a substrate 210, a main radiator element 220, high-impedance members 221-222, a parasitic radiator element 230, high-impedance members 231-232 and a feeder 240. The high-impedance members 221-222 and 231-232 are all grounded. The high-impedance members 221-222 are coplanar with and contact the main radiator element 220, and each of the high-impedance members 221-222 has an impedance value higher than that of the main radiator element 220. Similarly, the high-impedance members 231-232 are coplanar with and contact the parasitic radiator element 230, and each of the high-impedance members 231-232 has an impedance value higher than that of the parasitic radiator element 230. The longitudinal direction of the high-impedance members 221-222 and 231-232 may be substantially the same.

Figure 2D:
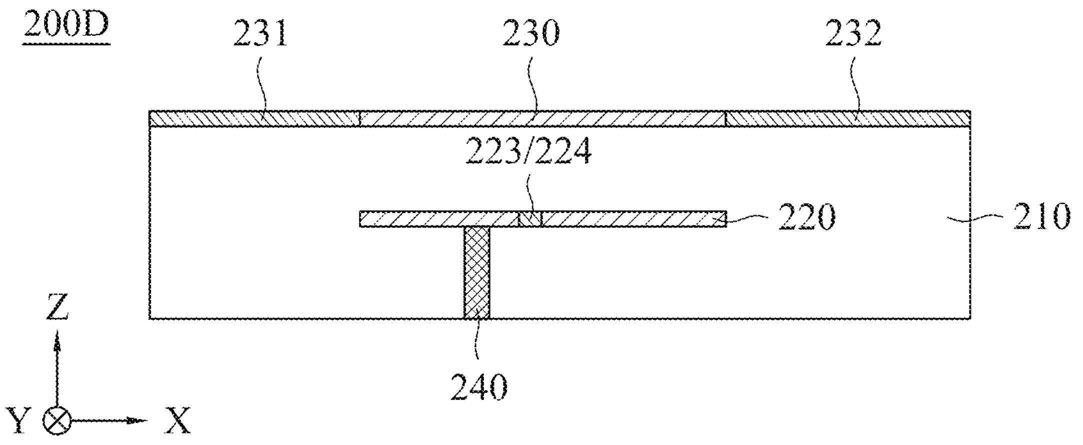

In FIG. 2D, the antenna structure 200D includes a substrate 210, a main radiator element 220, high-impedance members 223-224, a parasitic radiator element 230, high-impedance members 231-232 and a feeder 240. The high-impedance members 223-224 and 231-232 are all grounded. The high-impedance members 223-224 are coplanar with and contact the main radiator element 220, and each of the high-impedance members 223-224 has an impedance value higher than that of the main radiator element 220. Similarly, the high-impedance members 231-232 are coplanar with and contact the parasitic radiator element 230, and each of the high-impedance members 231-232 has an impedance value higher than that of the parasitic radiator element 230. The longitudinal direction of the high-impedance members 223-224 may be substantially perpendicular to that of the high-impedance members 231-232.

Figure 3:
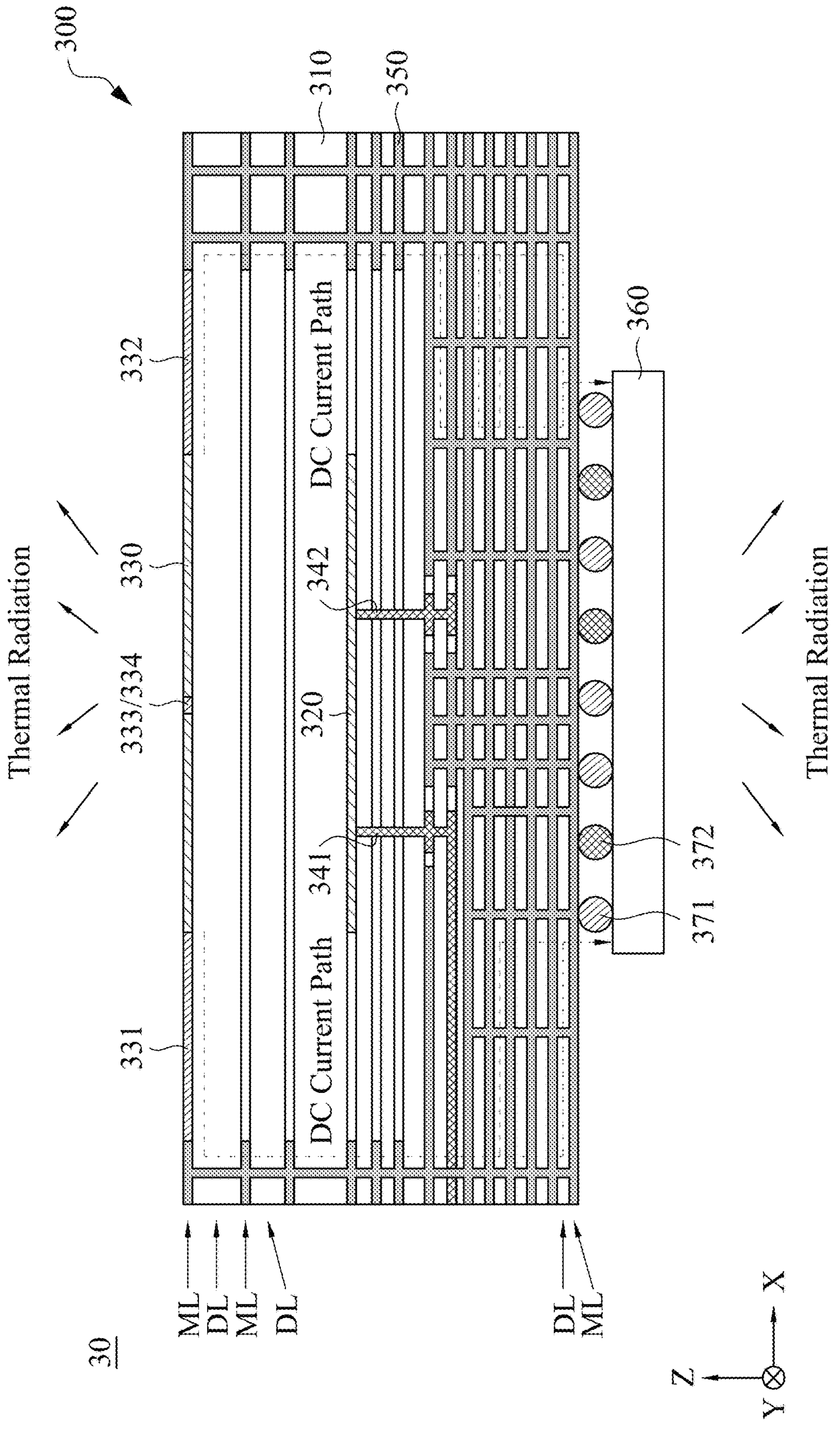
FIG. 3 is a schematic cross-sectional view of an antenna-in-package (AiP) in accordance with some implementations of the disclosure.

FIG. 3 is a schematic cross-sectional view of an antenna-in-package (AiP) 30 in accordance with some implementations of the disclosure. The antenna-in-package 30 may be a packaged module including an antenna structure 300 and a chip 360 bonded to each other. The antenna structure 300 includes a substrate 310, a main radiator element 320, a parasitic radiator element 330, high-impedance members 331-334, feeders 341-342 and a grounding structure 350. The substrate 310 is a multilayer structure formed of alternately stacked metal layers ML and dielectric layers DL. The metal layers ML may be formed form copper, aluminum, nickel and/or another metal, a mixture or a metal alloy thereof, an electrically conductive metallic compound, and/or another suitable material. Each metal layer ML may include one or more radiator elements, one or more conductive traces, one or more active electrical components (e.g. a switch), one or more passive electrical components (e.g. an inductor), and/or another component for electromagnetic radiation. The dielectric layers DL may be formed from FR4 material, glass, ceramic, epoxy resin, silicon, and/or another suitable material. Based on the material type of the dielectric layers DL, the substrate 310 may be formed by various processes, such as low-temperature cofired ceramic (LTCC), integrated passive device (IPD), multi-layered film, multi-layered PCB or another multi-layered process.

In some implementations, as shown in FIG. 3, the metal layers ML are alternately stacked with the dielectric layers DL in a normal direction (e.g. the z-axis direction shown in FIG. 3) of the antenna structure 300. The metal layers ML may be formed from the same material (e.g. copper) or different materials. Similarly, the dielectric layers DL may be formed from the same material (e.g. epoxy resin) or different materials. Another stacked structure with the metal layers ML and the dielectric layers DL may be made according to the antenna structure 300 shown in FIG. 3. For example, two or more of the dielectric layers DL may be interposed between adjacent two of the metal layers ML. The number of the metal layers ML and the number of the dielectric layers DL may be determined based on design requirements for the antenna structure 300. Also, the metal layers ML and the dielectric layers DL may include different patterns based on design requirements of the antenna structure.

The main radiator element 320 and the parasitic radiator element 330 are located in different metal layers ML. The main radiator element 320 and the parasitic radiator element 330 may be patches which are arranged in parallel and overlapped with each other in the normal direction of the antenna structure 300 for eliminating surface waves. In some implementations, the main radiator element 320 and the parasitic radiator element 330 are rectangular patch radiators. Other shapes and/or types of the main radiator element 320 and the parasitic radiator element 330 may be adopted in other implementations.

The high-impedance members 331-334 directly contact the parasitic radiator element 330 and the grounding structure 350. Each of the high-impedance members 331-334 is directly coupled between the parasitic radiator element 330 and the grounding structure 350. As shown in FIG. 3, the high-impedance members 331-334 may be coplanar with the parasitic radiator element 330, i.e., the parasitic radiator element 330 and the high-impedance members 331-334 may be located in the same metal layer ML. In addition, each of the high-impedance members 331-334 has an impedance value higher than that of the parasitic radiator element 330. Similar to the high-impedance members 131-134 shown in FIGS. 1A-1B, the high-impedance members 331-334 may respectively contact four edges of the parasitic radiator element 330, and may extend respectively in different directions.

The feeders 341-342 are directly coupled to the main radiator element 320 for feeding energy thereto, so as to radiate electromagnetic waves. Each of the feeders 341-342 may include a via and a trace for electrically coupling other electrical components in the same antenna structure 300, such as an active electrical component (e.g. a switch), a passive electrical component (e.g. an inductor), a combination thereof, or an electrical device bonded to the antenna structure 300. The main radiator element 320, the parasitic radiator element 330 and the feeders 341-342 may be configured to form a dual-polarized radiator. In other words, the feeders 341-342 may be configured to generate a dual-polarized radiation pattern on the substrate 310.

The grounding structure 350 laterally surrounds the main radiator element 320 and the parasitic radiator element 330 and form a cavity backed aperture for suspending surface wave propagations between the dielectric layers DL and the metal layers ML. The grounding structure 350 may be a via wall structure which includes longitudinally overlapped strip frames respectively in the metal layers as well as grounding vias coupling the strip frames. Each grounding via of the grounding structure 350 may be a blind via, a buried via, a stacked via, a staggered via, a combination thereof, or any type of via applicable to the antenna structure 300, and may be formed by laser drilling, electroplating, electroless plating, or another suitable technique. In some implementations, each grounding via of the grounding structure 350 vertically extends from the uppermost metal layer ML to the lowermost metal layer ML. The grounding structure 350 may have a frame shape in the planar view of the antenna structure 300, such as a rectangular frame shape or any other frame shape.

As shown in FIG. 3, the antenna structure 300 may be bonded with the chip 360 through bumps. The chip 360 is located at the side opposite to the radiation side of the antenna structure 300. In other words, the main radiator element 320 is vertically between the parasitic radiator element 330 and the chip 360. The chip 360 may be an radio-frequency integrated chip (RFIC), an analog integrated chip (IC), a mixed-signal IC, an application specific IC (ASIC) or the like. The bumps may consist of ground bumps 371 for electrically coupling the grounding structure 350 of the antenna structure 300 and the ground pins (not shown) of the chip 360 and signal bumps 372 for electrically coupling the electrical components (such as the feeders 341-342) in the antenna structure 300 and the signal pins (not shown) of the chip 360.

For the antenna-in-package 30 shown in FIG. 3 in which the antenna structure 300 is bonded with the chip 360, heat can be dissipated over the two opposite planar sides of the antenna structure 300 (e.g. over the parasitic radiator element 330 and the chip 360). The combination of the high-impedance members 331-334, the parasitic radiator element 330 and the uppermost metal layer of the grounding structure 350 function as a filter (e.g. a low-pass filter) for allowing DC component signals to flow into the grounding structure 350 (such as the DC current paths shown in FIG. 3) but blocking RF signals for helping dissipate heat without disturbing the performance of the antenna structure 300 at radio frequencies.

The antenna structure 300 may be modified to an aperture-fed antenna structure in which the feeders 341-342 are substituted with feeding traces that may electromagnetically couple energy to the main radiator element 320 through two slots defined by a ground plane element of the substrate 310 for a wideband bandwidth as well as a high antenna gain. Moreover, the antenna structure 300 may include solder balls (not shown) for bonding to a printed circuit board or the like.

Figure 4:
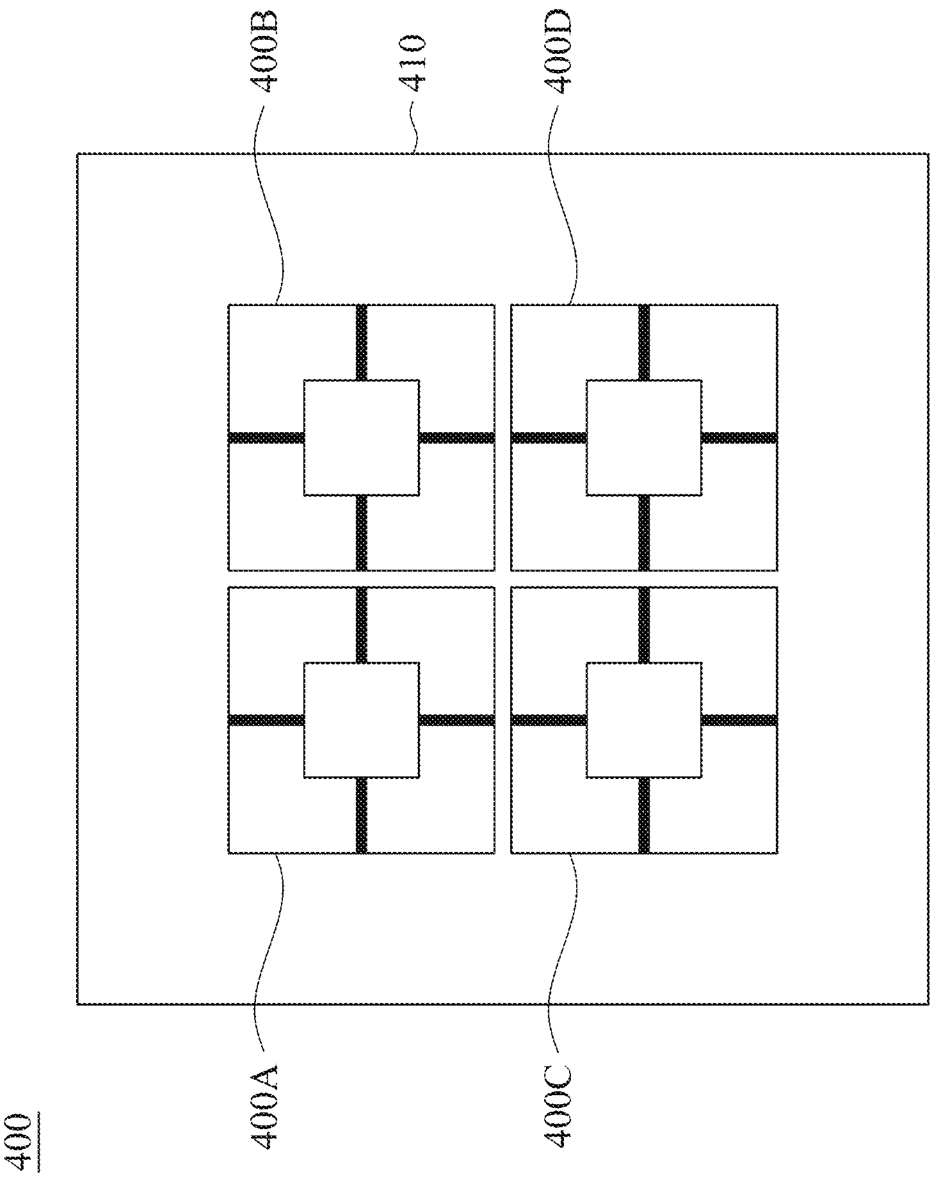
FIG. 4 is a schematic diagram of an antenna array in accordance with some implementations of the disclosure.

FIG. 4 is a schematic diagram of an antenna array 400 in accordance with some implementations of the disclosure. In FIG. 4, the antenna array 400 has four antenna cells 400A-400D arranged in an array of two rows and two columns. Each of the antenna cells 400A-400D may have a structure similar to the antenna structure 100 shown in FIGS. 1A-1B, the antenna structure 200A/200B/200C/200D shown in FIG. 2A/2B/2C/2D, or the antenna structure 300 shown in FIG. 3 for better antenna isolation. The antenna array 400 may be a stacked structure of plural metal layers and plural dielectric layers. In particular, in some implementations, the metal layers are alternately stacked with the dielectric layers in the normal direction of the antenna array 400. In such stacked structure, the antenna cells 400A-400D may be concurrently formed, and the stacked metal layers and dielectric layers extend crossing the antenna cells 400A-400D. That is, the dielectric layers and the metal layers of the antenna cells 400A-400D may be mapped in a one-to-one manner. In other words, the first metal layer of the antenna cell 400A may be mapped to the first metal layer of the antenna cell 400B, the first dielectric layer of the antenna cell 400A may be mapped to the first dielectric layer of the antenna cell 400B, the second metal layer of the antenna cell 400A may be mapped to the second metal layer of the antenna cell 400B, and the like. Another shape, arrangement and/or number of antenna cells may be made for various applications. For example, the antenna array 400 may be modified to have more than two rows of antenna cells and/or more than two columns of antenna cells, and/or each of the antenna cells 400A-400D may be in a rectangular or triangle shape or any other suitable shape. In some other examples, the antenna cells 400A-400D may be individual antenna modules. In particular, the antenna cells 400A-400D may be physically separated and each may have a structure similar to the antenna structure 100 shown in FIGS. 1A-1B, the antenna structure 200A/200B/200C/200D shown in FIG. 2A/2B/2C/2D or the antenna-in-package 30 or the antenna structure 300 shown in FIG. 3. The antenna cells 400A-400D may be bonded to a printed circuit board 410 via solder balls (not shown) to form a packaged antenna array module.

Figure 5A:
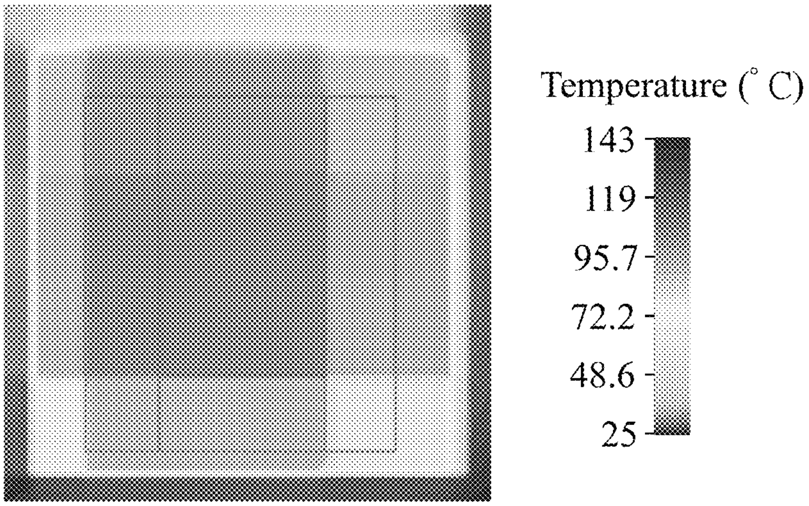
FIG. 5A shows the thermal performance of the antenna array with high-impedance members and a heat sink installed at the back side thereof and operating in a frequency band around 28 GHz.
Figure 5B:
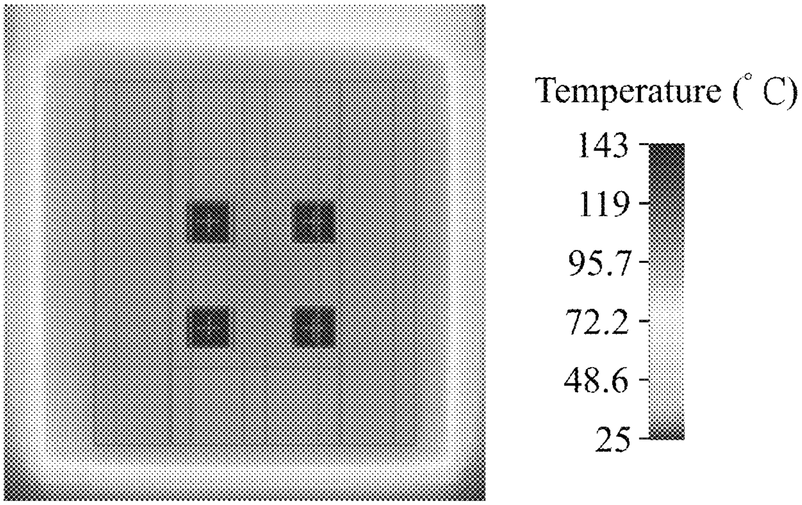
FIG. 5B shows the thermal performance of a conventional antenna array with a heat sink installed at the back side thereof but without the high-impedance members and operating in a frequency band around 28 GHz.

FIG. 5A shows the thermal performance of the antenna array 400 with high-impedance members and a heat sink installed at the back side and operating in a frequency band around 28 GHz, and FIG. 5B shows the thermal performance of a conventional antenna array with a heat sink installed at the back side but without the high-impedance members and operating in a frequency band around 28 GHz. As shown in FIGS. 5A-5B, the highest temperature of the conventional antenna array is up to about 143° C., while the highest temperature of the antenna array 400 is up to about 107° C. Therefore, the high-impedance members adopted in the implementations of the disclosure helps dissipating heat during operation. In addition, the return loss and antenna gain performances for the implementations of the disclosure keep at approximately the same level, and the frequency shift due to the high-impedance members can be easily calibrated by slightly adjusting the electrical components in the antenna structure.

Figure 6:
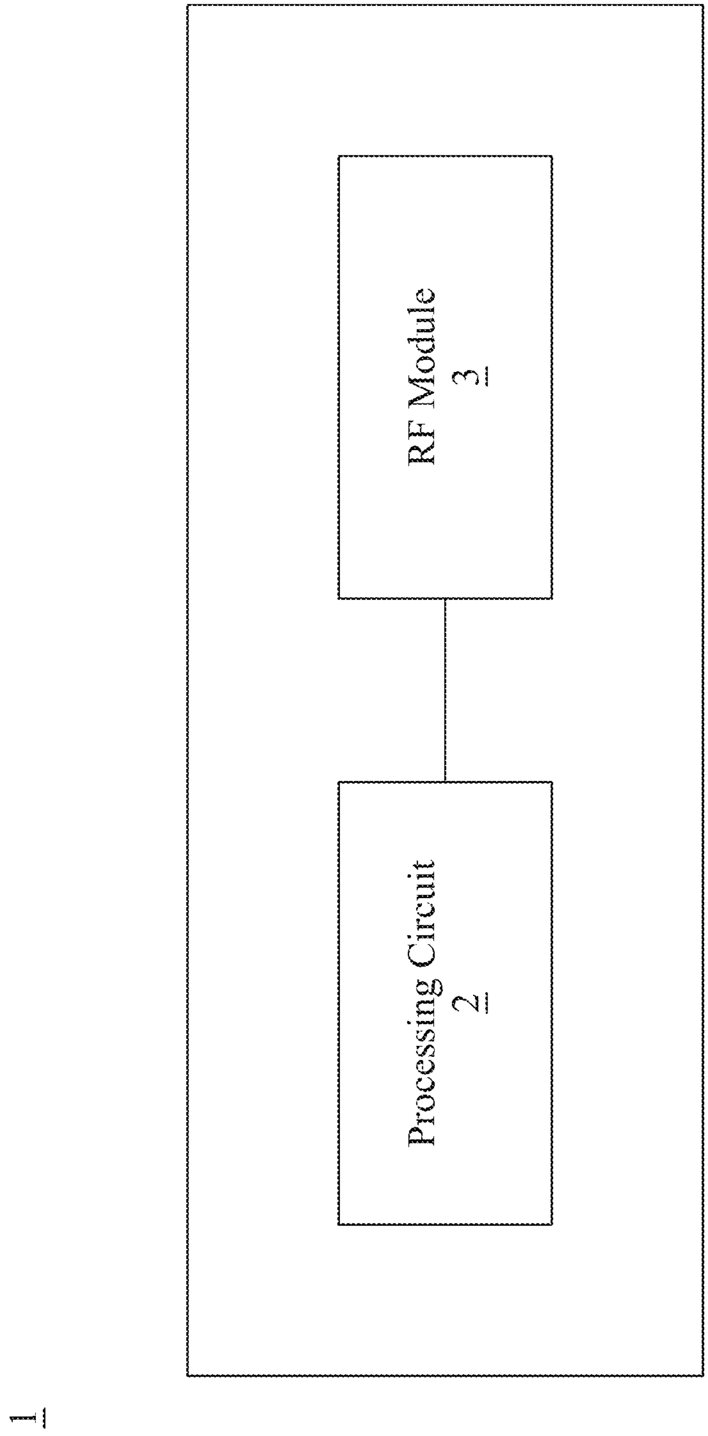
FIG. 6 is a schematic block diagram of an apparatus in accordance with some implementation of the disclosure.

FIG. 6 is a schematic block diagram of an apparatus 1 in accordance with some implementation of the disclosure. The apparatus 1 includes a processing circuit 2 and a radio-frequency (RF) module 3. The processing circuit 2 may be configured to encode data bits to generate a coded baseband signal and decode the signal from the RF module 3 into data bits according to a protocol stack, such as Radio Resource Control (RRC), Media Access Control (MAC), Radio Link Control (RLC), Service Data Adaptation Protocol (SDAP), Packet Data Convergence Protocol (PDCP), physical layer (PHY) coding and decoding and/or the like. The processing circuit 2 may be a processor, a microprocessor, an application-specific integrated circuit (ASIC), a digital signal processor (DSP), a field programmable gate array (FPGA), and/or the like. The RF module 3 may have one or more antennas as well as a circuitry, such as an RFIC, a power amplifier (PA), a low-noise amplifier (LNA), and so on, for modulating the baseband signal outputted by the processing circuit 2 into an RF signal for radio transmissions through the RF module 3, and/or for demodulating the RF signal received through the RF module 3 to a baseband signal. The antenna of RF module 3 is configured to perform RF signal transmissions and receptions through air. The RF module 3 may include a singular antenna with an antenna structure according to the implementations of the disclosure (such as the antenna structure 100 shown in FIGS. 1A-1B, the antenna structure 200A/200B/200C/200D shown in FIG. 2A/2B/2C/2D, the antenna-in-package 30 or the antenna structure 300 shown in FIGS. 3A-3B, or the antenna array 400 shown in FIG. 4), plural antennas at least one with an antenna structure according to the implementations of the disclosure (such as the antenna structure 100 shown in FIGS. 1A-1B, the antenna structure 200A/200B/200C/200D shown in FIG. 2A/2B/2C/2D, the antenna-in-package 30 or the antenna structure 300 shown in FIGS. 3A-3B, and/or the antenna array 400 shown in FIG. 4). Another antenna structure or antenna array may also or alternatively be arranged in the RF module 3 of the apparatus 1.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. An antenna structure, comprising:
- a main radiator element;
- a parasitic radiator element disposed in parallel with the main radiator element;
- a feeder configured to electrically or electromagnetically couple the main radiator element;
- at least one first high-impedance member directly contacting the parasitic radiator element and configured to be electrically grounded; and
- a grounding structure directly contacting the at least one first high-impedance member and laterally surrounding between the main radiator element and the parasitic radiator element.

2. The antenna structure of claim 1, wherein the at least one first high-impedance member and the parasitic radiator element are coplanar and in the same metal layer.

3. The antenna structure of claim 1, further comprising:
- a dielectric layer interposed between the main radiator element and the parasitic radiator element.

4. The antenna structure of claim 1, wherein the parasitic radiator element is a rectangular patch radiator, and wherein the at least one first high-impedance member are four high-impedance traces respectively contacting four edges of the parasitic radiator element.

5. The antenna structure of claim 1, further comprising:
- at least one second high-impedance member directly contacting the main radiator element and configured to be electrically grounded.

6. The antenna structure of claim 5, wherein the at least one second high-impedance member and the main radiator element are coplanar and in the same metal layer.

7. The antenna structure of claim 5, wherein the main radiator element is a rectangular patch radiator, and wherein the at least one second high-impedance member are four high-impedance traces respectively contacting four edges of the main radiator element.

8. The antenna structure of claim 1, wherein the grounding structure comprises a plurality of grounding vias each extending from a vertical level of the main radiator element to a vertical level of the parasitic radiator element.

9. An antenna structure, comprising:
- a main radiator element;
- a parasitic radiator element disposed in parallel with the main radiator element;
- a feeder configured to electrically or electromagnetically couple the main radiator element; and
- at least one high-impedance member directly contacting the main radiator element and configured to be electrically grounded.

10. The antenna structure of claim 9, wherein the at least one high-impedance member and the main radiator element are coplanar and in the same metal layer.

11. The antenna structure of claim 9, further comprising:

a dielectric layer interposed between the main radiator element and the parasitic radiator element.

12. The antenna structure of claim 9, wherein the main radiator element is a rectangular patch radiator, and wherein the at least one high-impedance member are four high-impedance traces respectively contacting four edges of the main radiator element.

13. An antenna-in-package, comprising:

a multilayer substrate having a stack of a plurality of dielectric layers and a plurality of metal layers and comprising:

a main radiator element in a first metal layer of the plurality of metal layers;

a parasitic radiator element in a second metal layer of the plurality of metal layers, wherein the main radiator element and the parasitic radiator element are disposed in parallel and spaced by at least one of the plurality of dielectric layers;

a first feeder configured to electrically or electromagnetically couple the main radiator element;

at least one high-impedance member directly contacting the parasitic radiator element and configured to be electrically grounded; and a grounding structure directly contacting the at least one high-impedance member and laterally surrounding the main radiator element and the parasitic radiator element; and a chip bonded to the multilayer substrate and electrically coupled to the main radiator element and the grounding structure.

14. The antenna-in-package of claim 13, wherein the at least one high-impedance member and the parasitic radiator element are coplanar and in the same one of the plurality of metal layers.

15. The antenna-in-package of claim 13, wherein the grounding structure comprises a plurality of grounding vias each vertically extending from an uppermost metal layer of the plurality of metal layers to a lowermost metal layer of the plurality of metal layers.

16. The antenna-in-package of claim 13, wherein the parasitic radiator element is a rectangular patch radiator, and wherein the at least one high-impedance member are four high-impedance traces respectively contacting four edges of the parasitic radiator element.

17. The antenna-in-package of claim 13, further comprising:

a second feeder electrically or electromagnetically couple the main radiator element;

wherein the first feeder and the second feeder are configured to generate a dual-polarized radiation pattern on the multilayer substrate.

18. The antenna-in-package of claim 13 wherein the main radiator element is vertically between the parasitic radiator element and the chip.

19. The antenna-in-package of claim 13, wherein the chip is a radio-frequency integrated chip (RFIC).

* * * * *